No. 744,205. PATENTED NOV. 17, 1903.
G. A. KENNEDY.
NUT LOCK.
APPLICATION FILED JUNE 17, 1903.
NO MODEL.
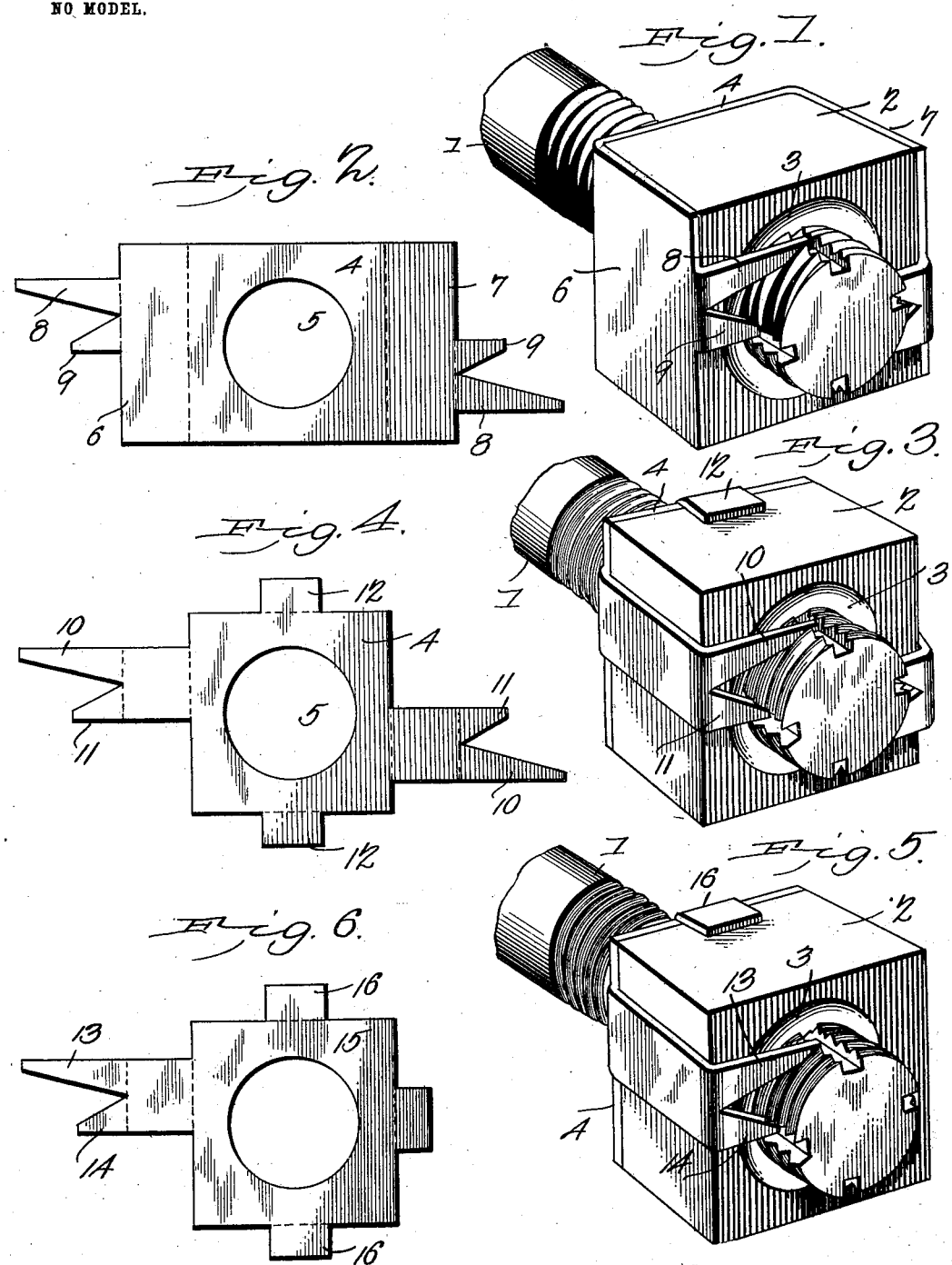
Witnesses
E. F. Stewart
B. P. Dunk
G. A. Kennedy, Inventor,
by C. A. Snow & Co
Attorneys No. 744,205. Patented November 17, 1903.

UNITED STATES PATENT OFFICE.

GEORGE A. KENNEDY, OF MEDIAPOLIS, IOWA, ASSIGNOR OF ONE-EIGHTH TO WILLIAM WARD CILLEY, OF MEDIAPOLIS, IOWA.

NUT-LOCK.

SPECIFICATION forming part of Letters Patent No. 744,205, dated November 17, 1903.

Application filed June 17, 1903. Serial No. 161,945. (No model.)

*To all whom it may concern:*

Be it known that I, GEORGE A. KENNEDY, a citizen of the United States, residing at Mediapolis, in the county of Des Moines and State of Iowa, have invented a new and useful Nut-Lock, of which the following is a specification.

This invention relates to nut and bolt locks, the object being to provide a cheap, durable, and efficient means for fastening the nut and bolt against relative movement when the nut has assumed the proper position upon the bolt.

A further object of the invention is to provide means whereby the bolt will be engaged at substantially a tangent to its circumference, so as to provide a positive engagement to efficiently lock it against turning.

A still further object is to provide an association of elements capable of being readily assembled and disengaged.

Further objects and advantages as well as the novel features of the invention will be specifically described hereinafter, reference being had to the accompanying drawings, in which—

Figure 1 is a perspective view of a nut and bolt, showing my invention applied. Fig. 2 is a plan view of the washer-blank. Fig. 3 is a perspective view of a nut and bolt, showing a slightly-modified form of washer. Fig. 4 is a plan view of the washer therefor. Fig. 5 is a perspective view of a further-modified form of washer, and Fig. 6 is a plan view of the blank therefor.

In carrying out the invention I prefer to employ a grooved bolt 1, the grooves of which are longitudinally disposed in such a manner that a bolt will be quadrantally engaged. The nut 2, threaded on the bolt, can be formed with a concavity or recess 3 in one face thereof, so as to permit a tool to be slipped under the tongues of the washer which forms the means of locking the bolt and nut together.

The preferred form of washer illustrated in Fig. 1 comprises a plate 4, having a bolt-opening 5 and oppositely-located upstanding flanges 6 and 7, from each of which project tongues 8 and 9, arranged in pairs and one in each pair being disposed at substantially a tangent to the bolt which they engage. One tongue in each pair is longer than its associate to engage a groove at substantially a right angle to the groove engaged by the shorter tongue, so that when the respective pairs of tongues are in engagement with the bolt said bolt will be quadrantally contacting with the tongues of the washer and will be effectually held against turning. It will be observed that the substantially tangentially disposed tongues in the respective pairs of the tongue are inclined in different directions to offer the most resistance to the turning of the nut. In the form illustrated in Figs. 3 and 4 the tongues 10 and 11 are similarly arranged, and one on each pair is longer than the other, and these tongues engage the grooves in the bolt in a manner similar to the engagement by the tongues in the preferred form. Side lugs 12 are also formed on the plate for contact with the side of the nuts to hold the nut seated therebetween.

A further modification of the invention is illustrated in Figs. 5 and 6, in which a single pair of tongues 13 and 14 is shown, the plate 15 being fastened to the nut by a plurality of lugs or projections 16.

It will be observed that the parts can be readily assembled, and by inserting a tool under the tongues, which is permitted by the recess in the nut, they can be bent up and the nut can be removed.

I claim—

1. The combination with a bolt and a nut thereon, of a washer on the bolt and having tongues of different lengths and engaging the bolt at substantially right angles to each other.

2. The combination with a bolt and a nut thereon, of a washer on the bolt and having adjacent tongues of different lengths and arranged at angles to each other engaging the bolt.

3. The combination with a bolt and a nut having a concavity adjacent to its bolt-opening, of a washer having ductile tongues extending over the concavity and engaging the bolt.

4. The combination with a bolt and a nut having concavity at its bolt-opening, of a washer having tongues engaging the bolt and extending over the concavity.

5. A nut and bolt lock washer comprising a plate, upstanding flanges on the plate, and pairs of connected tongues of different lengths carried by the flanges for engagement with a bolt at different points.

In testimony that I claim the foregoing as my own I have hereto affixed my signature in the presence of two witnesses.

GEORGE A. KENNEDY.

Witnesses:
SIDNEY T. HODGES,
JOSEPH A. HEFFERMAN.